March 21, 1967   M. J. MITCHELL ETAL   3,309,854
HEAVY DUTY FLAIL ROTOR

Filed April 24, 1964   2 Sheets-Sheet 1

INVENTORS.
MELVILLE J. MITCHELL &
FRED W. NOLLER
BY Tweedale & Gerhardt
ATTORNEYS.

March 21, 1967 M. J. MITCHELL ET AL 3,309,854
HEAVY DUTY FLAIL ROTOR
Filed April 24, 1964 2 Sheets-Sheet 2
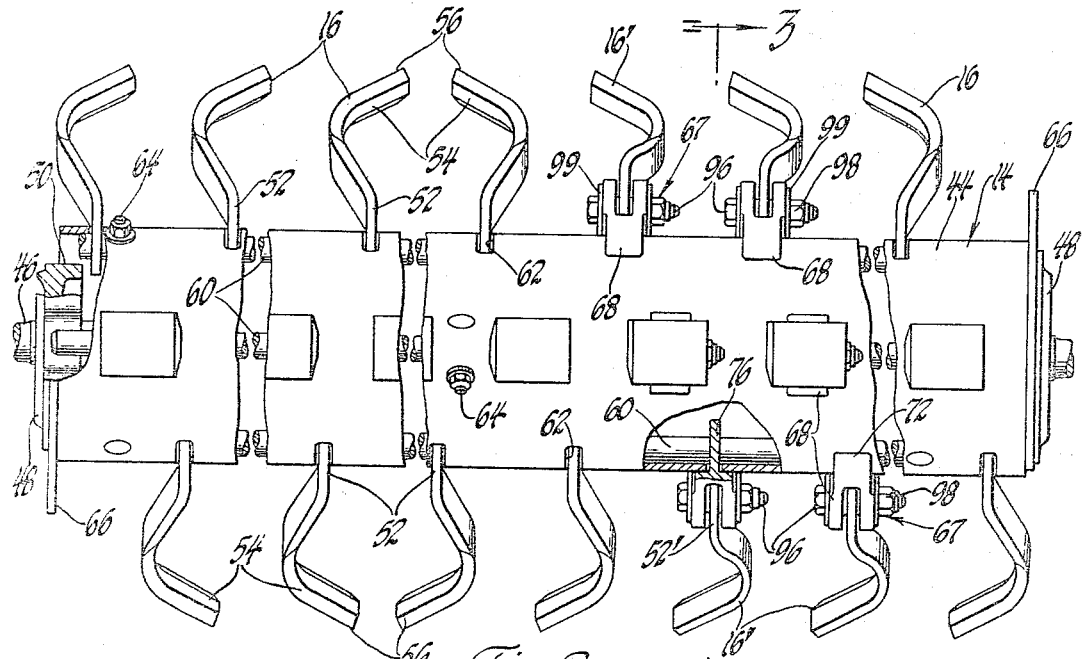
Fig. 2
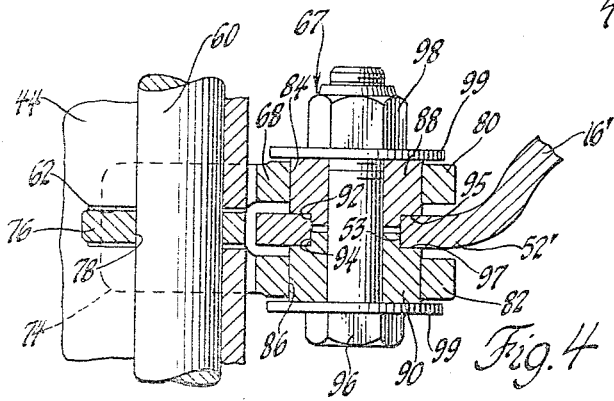
Fig. 3
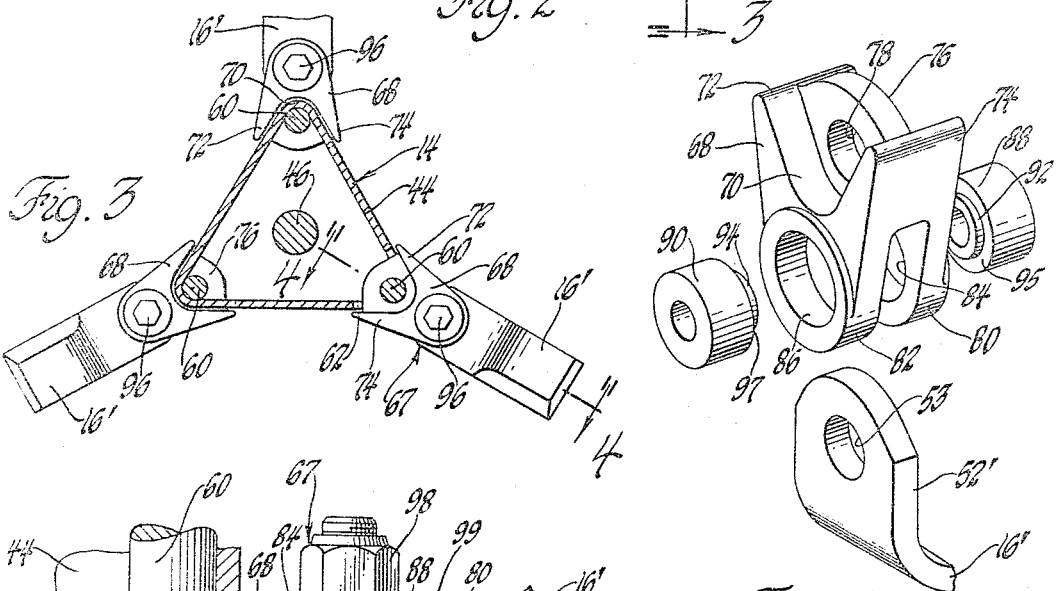
Fig. 5
Fig. 4
INVENTORS.
MELVILLE J. MITCHELL &
BY FRED W. NOLLER
Tweedale & Gerhardt
ATTORNEYS.

United States Patent Office 3,309,854
Patented Mar. 21, 1967

3,309,854
HEAVY DUTY FLAIL ROTOR
Melville J. Mitchell, Birmingham, and Fred W. Noller, Farmington, Mich., assignors to Massey-Ferguson Inc., Detroit, Mich.
Filed Apr. 24, 1964, Ser. No. 362,265
6 Claims. (Cl. 56—504)

This invention relates to forage harvesters and is particularly concerned with rotary flail forage harvesters of the type having cutting elements pivotally mounted on an elongated rotor.

When a flail type harvester advances through the crop, the rotor thereof is caused to rotate about its longitudinal axis and centrifugal force acts to hold the cutting elements radially outward. Upon impact with any obstruction or relatively heavy crop material, the cutting elements are permitted to rotatably yield with respect to the rotor due to their pivotal connections.

In harvesting alfalfa or other grasses, the frequency of impact with heavy masses of material is relatively low, and all of the cutting elements are subjected to approximately the same frequency of impact blows. In the harvesting of heavier crops, and particularly row crops such as corn, material is fed into the rotary flail assembly in a concentrated stream with the result that those cutting elements located directly in the path of the concentrated stream of crop material are subjected to a greater magnitude and frequency of impact. Consequently, there is a greater amount of pivotal movement of the cutting elements relative to the rotor thus increasing the wear between the flails and the shafts on which they are pivotally mounted.

It is therefore an object of this invention to provide a flail rotor for forage harvester in which the amount of pivotal movement between the cutting elements and their supporting shafts is minimized to reduce wear.

Another object is to provide an improved, wear-resistant mounting assembly for pivotally connecting the cutting elements to the rotor of a flail type harvester.

Still another object is to provide a heavy duty mounting for pivotally connecting to the flail rotor those cutting elements subjected to the greatest amount of wear in such a manner that they can be individually removed and replaced from the rotor casing without disturbing the remaining cutters.

A further object is to provide a flail rotor in which the wear on individual cutting elements caused by pivotal movement of the cutting element on the rotor is reduced by transferring a portion of the pivotal action from the cutting element per se to a separate, wear-resistant supporting element.

Other objects and advantages of the invention will become apparent from the following description taken in connection with the accompanying drawings in which:

FIG. 2 is a plan view of a flail type rotor for the harvester of FIG. 1;

FIG. 3 is a sectional view taken on line 3—3 of FIG. 2 illustrating the heavy duty cutter assemblies;

FIG. 4 is an enlarged sectional detail view taken on line 4—4 of FIG. 3; and

FIG. 5 is an exploded perspective view of the assembly of FIG. 4.

Figure 1:
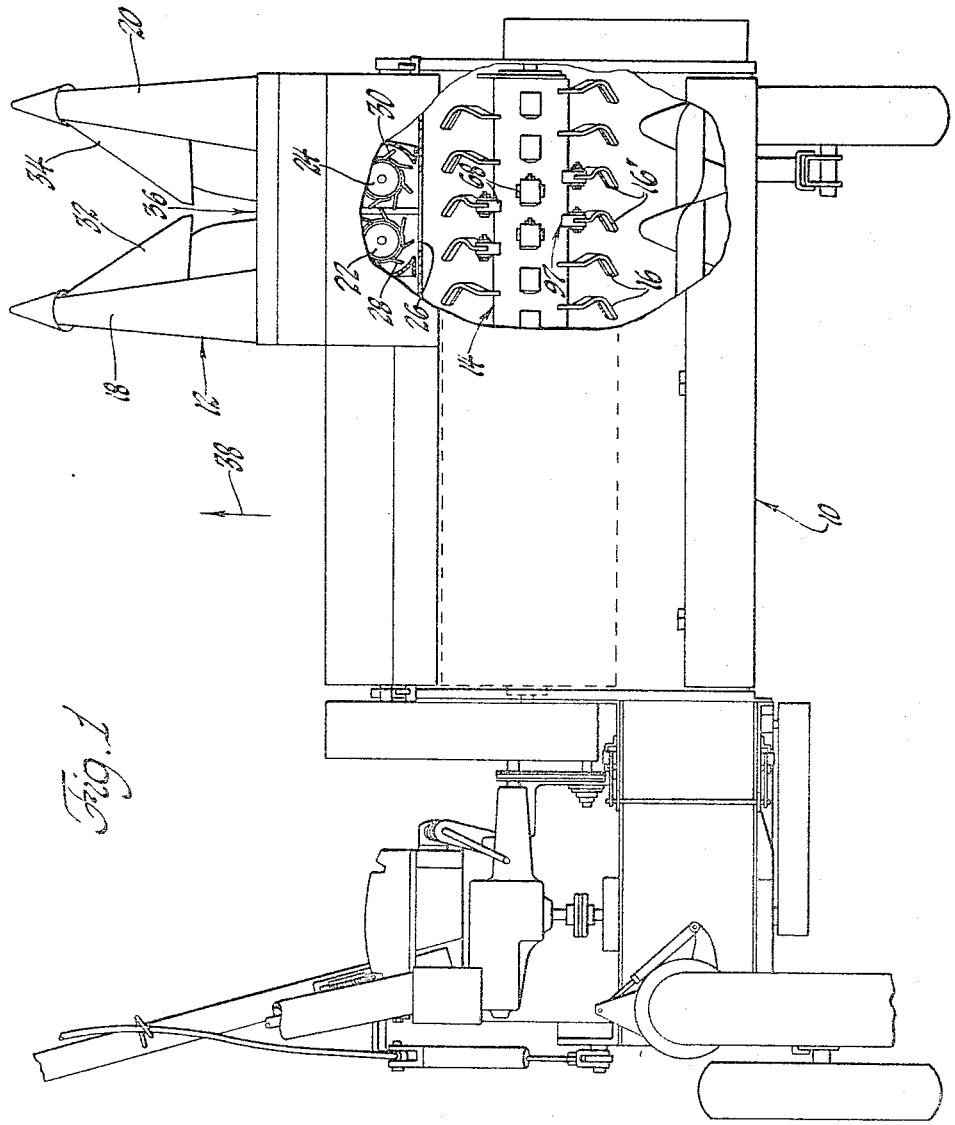
FIG. 1 is a plan view of a forage harvester having a row-crop attachment and embodying the invention in its preferred form.

While the invention will be described in connection with a preferred embodiment, it will be understood that we do not intend to limit the invention to the precise construction shown. On the contrary, we intend to cover all alternatives, modifications and equivalents as may be included within the spirit and scope of the invention.

With reference to FIGURE 1, reference numeral 10 designates a harvester having a row-crop attachment 12 connected thereto. Harvester 10 is provided with a flail rotor assembly 14 journalled in the frame of the harvester for rotation about its longitudinal axis. Pivotally connected with rotor 14 is a plurality of flails or cutting elements 16 and 16'. During rotation of rotor 14 about its longitudinal axis, cutting elements 16 and 16' are projected outwardly by centrifugal force.

Row-crop attachment 12 is provided with a pair of forwardly extending snouts 18 and 20 as well as a pair of feed rolls 22 and 24 journalled for rotation about their vertical axes. Feed rolls 22 and 24 are provided with fin plates 28 and 30, respectively, which are wound helically about the periphery of the rolls and operate to grip crop material and throw it rearwardly into the flail rotor assembly 14 through an opening 26.

Mounted on snouts 18 and 20, respectively, are flipper plates 32 and 34 which cooperate with the snouts to deflect crop material into the throat 36 defined between the snouts from which the material is carried to feed rolls 22 and 24. Thus, as the harvester advances in the direction of arrow 38, row-crop material, such as corn, is gathered in throat 36 and hurled rearwardly by feed rolls 22 and 24 into the cutting elements of rotor 14.

With refrence to FIGS. 2 and 3, rotor assembly 14 includes an elongated tubular casing 44 preferably of non-circular cross section, casing 44 being of triangular cross section in the illustrated embodiment. Casing 44 is supported for rotation about its central, longitudinal axis by a main shaft 46. Casing 44 is rigidly mounted on shaft 46 by means of a pair of end plates 48 as well as a plurality of intermediate support plates disposed within the casing (not shown). End plates 48 preferably have triangular body portions 50 dimensioned to fit into the end of the casing. Plates 50 may be non-rotatably secured to shaft 12 by a press fit, by welding or by any other conventional means.

As shown in FIGURES 1 and 2, two groups of cutting elements are mounted on rotor casing 44. Cutting elements 16' are mounted on the rotor in the area directly behind opening 26 (FIG. 1) where the stream of heavy row-crop material from feed rolls 22 and 24 is concentrated. In the illustrated embodiment, a plurality of cutting elements 16 are mounted on the remaining portion of the rotor casing.

Cutting elements 16 each comprise a shank portion 52 merging into a generally C shaped cutter portion 54. Shank portion 52 is apertured for mounting purposes and the edges of the cutting portions 54 are beveled to provide sharp cutting edges 56.

End plates 48 as well as the intermediate support plates have their corner portions cut away to define passages extending along each apex corner of the triangular casing. Received in each passage and fitting snugly into the casing apex is an auxiliary shaft 60, three such shafts being provided in the illustrated triangular casing. To accommodate cutting elements 16, casing 44 is formed with a series of transverse slots 62 (FIGS. 2 and 4) intersecting each apex.

Shank portions 52 are inserted in slots 62 with their apertures aligned to receive auxiliary shaft 60 to thereby provide pivotal support for the cutting elements. The length of slots 62 is sufficient to permit limited pivotal movement of each cutting element 16 about the axis of its associated shaft 60 permitting the cutting element to function in the matter of a flail. Preferably, the slots in the respective apexes are staggered so that the cutting paths of the elements slightly overlap to enable the assembly to cut a clean swath.

Auxiliary shafts 60 may be secured to casing 44 in any preferred manner. For example, angularly bent bolts 64 may be inserted through a pair of apertures in the casing wall on the opposite sides of each apex to extend around the shafts and anchor the shafts against the inner wall of the casing.

In order to precisely dynamically balance rotor assembly 14, a pair of eccentric plates 66 is welded or otherwise secured to end plates 48 at the opposite ends of the rotor. Eccentrically applied weights may be added to the plates when required, or the weight may be reduced by drilling small holes in the plates.

With the construction described heretofore, it is apparent that upon rotation of rotor casing 44 about the axis of shaft 46, cutting elements 16 will extend radially outwardly from the rotor casing to cut any material encountered as harvester 10 advances in the direction of arrow 38 (FIG. 1). Slots 62 permit cutting elements 16 to yield pivotally upon impact with stones or large masses of material.

With attachment 12 connected to harvester 10, the forces encountered by the heavy crop materials cause extensive wear of the cutting elemnts 16 at their connection with auxiliary shafts 60 due to the increased amount of pivotal movement caused by more frequent impact with heavy masses of material. Moreover, the stream of heavy crop material is concentrated in the area immediately behind opening 26, thus requiring more frequent removal and replacement of the cutting elements in this limited area of the rotor. In accordance with the present invention, heavy duty cutter assemblies 67 are mounted on the rotor casing in the area which encounters the heavy, concentrated stream of row-crop material.

Cutter assemblies 67 each include a heavy duty fitting 68 on which is pivotally mounted a cutting element 16'. Cutting elements 16' are substantially identical in construction to cutting elements 16 but having somewhat shorter shank portions 52' for reasons which will become apparent hereinafter. With reference particularly to FIGS. 3, 4 and 5, fitting 68 is formed with a generally V shape groove 70 defining a pair of diverging legs 72 and 74. Extending transversely from groove 70 intermediate its ends is a projection 76 having an aperture or opening 78 formed therein for receiving one of the auxiliary shafts 60. Projection 76 is disposed in a plane transverse to the longitudinal axes of shafts 46 and 60 when the projection is inserted into slots 62. Legs 72 and 74 engage the outer surface of casing 44 on either side of the apexes in which shafts 60 are received to prevent rotation of fitting 68 relative to the rotor casing.

Fitting 6 is further formed with outwardly projecting lug means in the form of a pair of ears 80 and 82 formed with aligned, coaxial openings 84 and 86, respectively. Rotatably mounted in openings 86 and 84, respectively, are cylindrical bushings 88 and 90 axially disposed in the openings in end-to-end relationship. Bushings 88 and 90 are formed with end portions 92 and 94 respectively, of reduced diameter which are disposed in opposed relationship to each other thereby defining a pair of spaced shoulders 95 and 97, respectively. As best shown in FIGS. 4 and 5, aperture 53 in the shank portion 52' of cutting element 16' is rotatably mounted on the reduced end portions between shoulders 95 and 97.

It should be noted that the axial length of portions 92 and 94 is less than the thickness of shank portion 52'. Consequently, cutting element 16' may be frictionally clamped between the opposed shoulders 95 and 97 of the bushings. Moreover, the combined axial length of bushings 88 and 90 together with the thickness of shank portion 52' is greater than the distance between the outer surfaces of ears 80 and 82. As a result, shank portion 52' may be frictionally secured against rotation relative to bushings 88 and 90 by means of a bolt 96 extending through aligned openings 84 and 86 secured thereto by means of a threaded nut 98. Washers 99 at opposite ends of the bolt limit the axial movement of the bushings in openings 86 and 84.

Since shank portion 52' is frictionally restrained against pivotal rotation relative to bushings 88 and 90, the pivotal action of cutting elements 16' is obtained primarily due to the rotation of bushings 88 and 90 in the relatively large openings 84 and 86. Since a larger surface is encountered by the bushings than would be the case if all the pivotal action were taken up by opening 53 in shank portion 52', the amount of wear is substantially reduced. Furthermore, each cutting element 16' can be individually removed and replaced from rotor casing 44 merely by removing bolt 96.

Since only a limited area of the rotor assembly encounters the heavy crop material when attachment 12 is employed, cutter assemblies 67 may be provided only at that portion of the rotor directly behind opening 26 (FIG. 1). However, it is obvious that the type of connection provided by fitting 68 can be employed throughout the rotor.

We claim:

1. A flail rotor for agricultural implements and the like comprising; an elongate rotor casing, a plurality of cutter assemblies mounted on the rotor casing, each of said cutter assemblies including lug means projecting radially outward from said rotor casing, an opening in said lug means having an axis parallel to the longitudinal axis of said rotor casing, a bushing rotatably mounted in said opening, a portion of reduced diameter formed on said bushing, a cutting element having an apertured shank portion rotatably mounted on the reduced diameter portion of said bushing, the aperture of said shank portion having a diameter less than the diameter of the opening in said lug means, and means axially clamping said shank portion against said bushing for frictionally restraining said cutting element against rotation relative to said bushing but permitting free rotation of said bushing in said lug means.

2. In a flail rotor assembly for agricultural implements and the like wherein a plurality of cutting elements are pivotally mounted on a rotor casing in such a manner that rotation of the rotor about its longitudinal axis causes the cutting elements to project radially outward from the rotor casing due to centrifugal force permitting the cutting elements to pivotally yield with respect to the rotor casing upon impact with masses of material, means for transferring a portion of the pivotal action between the cutting element and the rotor casing to a wear-resistant element comprising; lug means for each cutting element mounted on the rotor casing, a bushing rotatably mounted in said lug means and having a portion of reduced diameter projecting from said lug means, said cutting element having a shank portion with an aperture therein rotatably mounted on said reduced portion, and means axially clamping the shank portion against said bushing for frictionally restraining said cutting element against rotation relative to said bushing but permitting the bushing and cutting element to rotate freely as a unit within said lug means.

3. A flail rotor for agricultural implements and the like comprising; an elongate rotor casing supported for rotation about its longitudinal axis, a plurality of cutter assemblies mounted on said rotor casing, each cutter assembly including a pair of spaced ears projecting radially outward from the rotor casing, aligned openings in said pair of ears, bushing means rotatably mounted in said aligned openings, a portion of reduced diameter formed in said bushing means intermediate the ends thereof, a cutting element having an apertured shank portion received between said pair of ears and rotatably mounted on the reduced diameter portion of said bushing means, the diameter of the aperture in said shank portion being less than the diameter of the aligned openings in said pair of ears, and means frictionally restraining said cutting element against rotation relative to said bushing means but permitting free rotation of said bushing means in the openings of said pair of ears.

4. A flail rotor for agricultural implements and the like comprising; an elongate rotor casing, a plurality of cutter assemblies mounted on said rotor casing, each of said cutter assemblies including a pair of spaced ears having aligned openings therein, a pair of bushings rotatably mounted in the aligned openings of said pair of ears, each bushing of said pair having an end portion of reduced diameter disposed in opposed relationship with the reduced end portion of the other bushing of said pair to define a pair of spaced, opposed shoulders, a cutting element having an apertured shank portion received between said ears and mounted for rotation on the opposed, reduced end portions between said shoulders of said pair of bushings, said shank portion having a thickness greater than the combined axial length of said opposed, reduced end portions, and the ends of said bushings opposite said reduced end portions extending beyond the outer surfaces of said ears, and fastening means extending axially through said pair of bushings for clamping said shank portion between said shoulders to frictionally restrain said cutting element against rotation relative to said bushings but permitting free rotation of said bushings and cutting element with respect to said ears.

5. A flail rotor for agricultural implements and the like comprising; an elongate, tubular rotor casing, a main shaft extending through the longitudinal axis of said rotor casing, a plurality of auxiliary shafts mounted on the inner wall of said rotor casing in spaced, parallel relationship with said main shaft, a plurality of transverse slots formed in the tubular wall of said rotor casing each extending transversely on each side of one of said auxiliary shafts, a plurality of cutting assemblies mounted on said rotor casing, each of said cutting assemblies including a fitting having an apertured projection received in one of said slots with the associated auxiliary shaft received in the aperture thereof, abutment means on said fitting engaging the outer wall of said rotor casing on opposite sides of said auxiliary shaft to prevent rotation of said fitting relative to said auxiliary shaft, lug means on said fitting projecting radially outward from said rotor casing, and a cutting element pivotally mounted on said lug means.

6. A flail rotor as defined in claim 5 further including; an opening in said lug means having an axis parallel to the longitudinal axis of said rotor casing, bushing means rotatably mounted in said opening, an apertured shank portion on said cutting element rotatably mounted on said bushing, and means frictionally restraining said cutting element against rotation relative to said bushing but permitting free rotation of said cutting element and bushing relative to said lug means.

References Cited by the Examiner
UNITED STATES PATENTS 3,020,694    2/1962    Foshee et al. _____ 56—504 X
3,122,871    3/1964    Frevik et al. _____ 56—26 X ABRAHAM G. STONE, *Primary Examiner.*

P. RAZZANO, *Assistant Examiner.*